(No Model.)
E. G. T. COLLES.
FEED WATER HEATER.
No. 357,268. Patented Feb. 8, 1887.
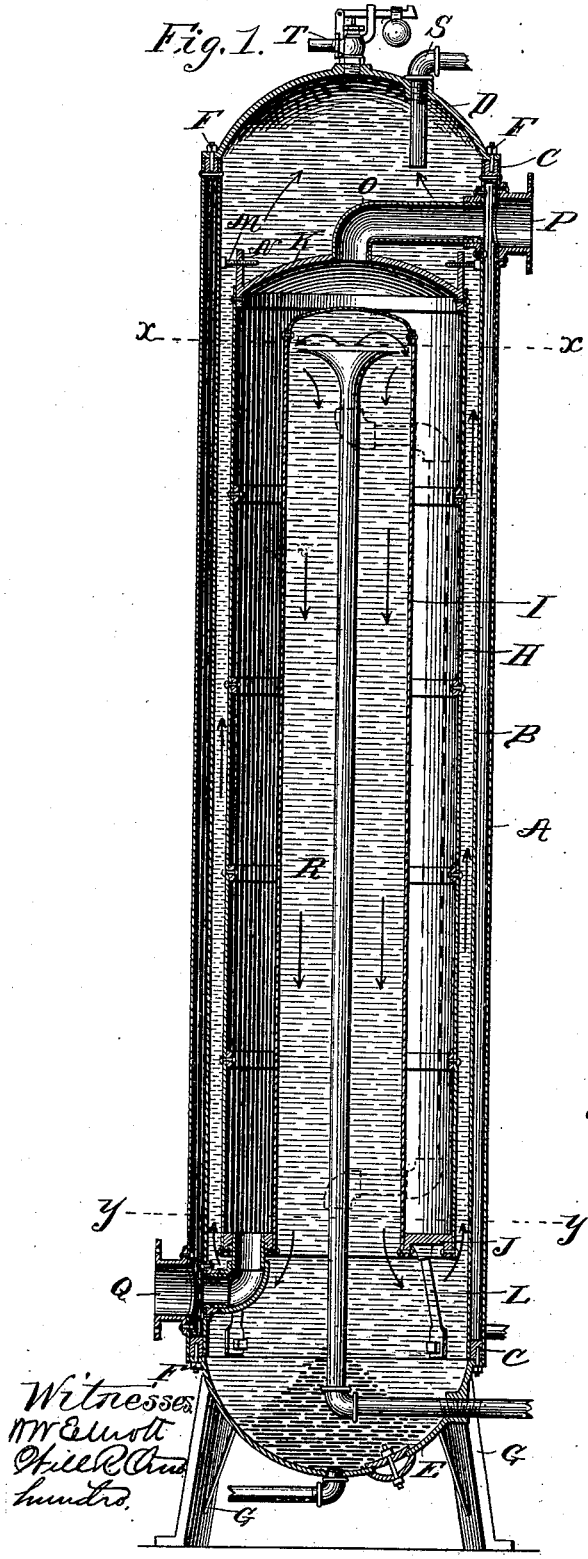
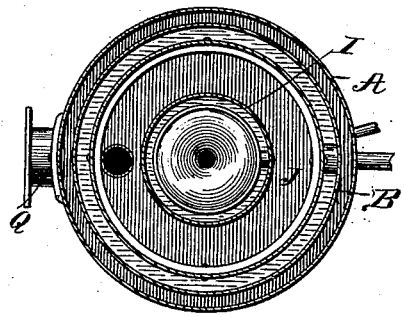
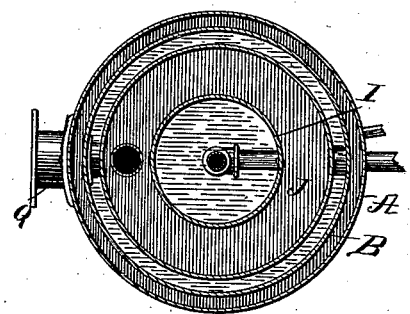
Witnesses
M R Elliott
Will R And
hundro.
Inventor
Edward G. T. Colles
By Jno. G. Elliott
Atty.

UNITED STATES PATENT OFFICE.

EDWARD G. T. COLLES, OF CHICAGO, ILLINOIS.

FEED-WATER HEATER.

SPECIFICATION forming part of Letters Patent No. 357,268, dated February 8, 1887.

Application filed October 12, 1886. Serial No. 215,995. (No model.)

*To all whom it may concern:*

Be it known that I, EDWARD G. T. COLLES, a citizen of the United States, residing in Chicago, county of Cook, and State of Illinois, have invented certain new and useful Improvements in Feed-Water Heaters, of which the following is a specification.

This invention relates to improvements in feed-water heaters in which the water during its passage through the heater is passed between an outer and inner steam-jacket.

I am aware that prior to my invention a feed-water heater has been constructed with a water-chamber below and above a steam-chamber and connected by pipes passing through said steam-chamber; but such a construction is objectionable, because of the variation in the current of water through the pipes, both as regards speed and temperature, because of the limited amount of heating-surface consistent with the practical dimensions of a heater, and, finally, because of the multiplicity of joints and connections rendered necessary in a heater constructed after the manner just described, promoting the liability of the escape of steam into the water-chambers, or of water into the steam-chamber, and greatly increasing the cost of manufacture.

I am also aware that prior to my invention a heater has been constructed with a water-chamber between an external steam-jacket and an internal steam-cylinder for raising the temperature of water during its passage through the heater; but this construction is also objectionable for the reason that the hollow internal steam-chamber permits the expansion of the steam contained therein to such an extent that the temperature of the steam is materially reduced, and as a consequence the water is not heated to the greatest possible degree with a given amount of steam. In addition to this there is a useless waste of space and a consequent reduction of the heating-surface that materially detracts from the value of such an apparatus as a feed-water heater.

The object of this invention is to dispense with the employment of flues or pipes passing through a steam-chamber and connecting water-chambers above and below said steam-chamber, thereby dispensing with the necessity for a multiplicity of joints and connections resulting from such a construction, and to have in my heater the greatest possible amount of heating-surface consistent with a given and practical size of apparatus.

Other objects are to introduce the water into the heater in such a manner and at such a point as to subject it to the maximum degree of heat for the longest period of time possible in a device of this class, whereby the temperature of the water may be raised to a degree not possible in the prior constructions, and the precipitation of impurities contained therein promoted in a corresponding degree; to dispense with the employment of a hollow internal steam-cylinder by occupying a portion of its space with a corresponding portion of the water-chamber, whereby a greater heating-surface is obtained than heretofore practical, and to provide certain details of construction in the carrying out of my invention, all as illustrated in the accompanying drawings, in which—

Figure 1 represents a central vertical section of a feed-water heater embodying my invention; Fig. 2, a horizontal section thereof on line *x x*, and Fig. 3 a similar view on line *y y*.

Similar letters of reference indicate the same parts in the several figures of the drawings.

Referring by letter to the accompanying drawings, A B indicate two shells or hollow cylinders secured at the tops and bottoms thereof to the annular rings C C, upon the outer and inner peripheries, respectively, of said rings, the shell B having the smaller diameter and being encompassed by the shell A so as to leave a space therebetween, constituting a steam jacket or chamber, for the purpose hereinafter described. The annular rings C C, being located at the ends of these shells, serve to close the ends of the space between the shells A B and maintain them at a uniform distance apart at all points, thus forming a double-walled cylinder. This double-walled cylinder has its ends closed by end caps, D E, hemispherical in outline, and secured to the annular rings by stud-bolts F, or in any other suitable and convenient manner, the cylinder, as a whole, being then supported upon end by the legs G G, secured to the lower end cap, E, which latter also serves as a sediment-chamber for containing the precipitation from the feed-water during its passage through the heater. Within this double-walled cylinder is located another double-walled cylinder composed of shells H and I, secured, respectively, at the bottoms thereof, to the outer and inner peripheries of another annular ring, J, but differing from the outer double-walled cylinder in that there is no end cap at the lower end of the cylinder, and that the upper ends of the shells are each provided with a separate and distinct end cap, thus converting the shell I into an elongated cylinder or blind-pipe, the blind or closed end of which projects into and occupies the central space of the closed cylinder by which it is surrounded, the shell H, in conjunction with the annular ring J and end cap, K, really constituting a closed cylinder. The blind-pipe or cylinder I is inverted, as shown, so that the open end projects downwardly and lies flush with the bottom of the shell H and annular ring J, to which it is secured. This internal double-walled cylinder, as a whole, is supported upon legs or rods L, secured, respectively, to the under side of the annular ring J and the inner wall of shell B of the outer cylinder, it being undertood that the diameter of the inner cylinder, or rather of the shell H, is sufficiently less than the inside diameter of the outer cylinder or the shell B to form an annular passage or space between said cylinders from end to end of the inner cylinder, which is somewhat shorter than the outer cylinder.

The internal cylinder is further supported and centered within the outer cylinder by means of screw-bolts M, working through lugs N, cast with or otherwise rigidly secured to the end cap K, the heads of which bolts impinge against the inner wall of the outer cylinder, and, while effectually preventing a lateral movement, permit a longitudinal movement of said cylinder when necessary to accommodate the expansion and contraction of the said cylinder in consequence of the variations in the temperature thereof.

The space between the shells H and I constitutes an internal annular steam-chamber, the inner shell, I, extending nearly the entire length of the outer shell, and just above the closed end thereof the steam-supply pipe O, for the said internal steam-chamber, connects therewith through the end cap, K, the opposite end of said pipe connecting with the outer steam-chamber between the shells A and B opposite the inlet-port P, through which steam is introduced into the said outer chamber. Likewise the lower end of the inner steam-chamber is connected by one or more pipes opening therein through the annular ring J, and into the outer steam-space through the shell B at corresponding points thereof, through which to exhaust the steam supplied to the internal cylinder through the pipe O, the steam being exhausted from the outer chamber through an exhaust-port, Q, to which and to the inlet-port suitable pipes may be connected.

The annular space between the inner and outer steam-chambers—that is to say, between the inner and outer double-walled cylinders, as well as the space in the outer cylinder above and below, and consequently unoccupied by the inner cylinder—constitutes the main water-chamber of my heater, of which the central space of the inner cylinder, or that inclosed by the blind-pipe or shell I, forms an extension or auxiliary chamber, into which the water supplied to the heater is first introduced through a pipe, R, led into the water-chamber at any desired point, but preferably through the lower end cap, E, of the outer cylinder. This water-pipe passes centrally up through the auxiliary water-chamber to near the upper end thereof, where its upper end is formed flaring or funnel-shaped, the edges of which extend almost to the side walls of the said chamber, so as to conduct the water fed therein in contact with the said heated walls, which, as before described, constitute the inner walls of the internal steam-chamber. However, this water-pipe before reaching the top of the water-chamber may be conducted up through the steam-chamber for the purpose of subjecting the water to the heat of said chamber before being discharged into the water-chamber, as illustrated in dotted lines in Fig. 1.

Numerous advantages are derived from the employment of the large auxiliary water-chamber, especially when combined with the funnel-shaped delivery end of the feed-pipe, prominent among which is the effectual heating of the water during its passage through the heater, for the manner of its introduction not only submits it to a greater heating-surface than is possible in any of the prior constructions for a given size of apparatus, but the water is unavoidably brought in contact with the heating-surface at its hottest point at the moment of introduction into the water-chamber, the discharge end of the feed-pipe being so arranged relative to the walls of the auxiliary water-chamber that the water in its entrance to said chamber must be divided into a thin annular sheet against the heated walls thereof. The water being introduced at such a point, and being necessarily cooler than the water already contained in the water-chamber, naturally descends, thus producing a constant and unvarying circulation through the heater, and as a result of such circulation the precipitation of impurities contained in the water is materially enhanced, the water at this time being subjected to the highest possible temperature and having a descending current. These precipitations, when released, settle into the bottom of the water-chamber, and the water itself turns at the lower end of the interior cylinder and passes upwardly through the annular space between the inner and outer steam chambers to the chamber above the internal cylinder, as indicated by the arrows in Fig. 1, from whence it is drawn off and fed to the boiler through a pipe, S, projecting through the upper end cap of the outer cylinder. The scum and other light impurities rise to the surface of the water at the highest point of the cylinder and above the opening of the pipe S, from whence they are discharged at suitable intervals through a blow-off, T, provided for that purpose.

A heater constructed after the manner herein described, in addition to the foregoing advantages, will contain so much water that the passage of the water through the heater will be necessarily so slow that it has time to become heated to the highest degree possible, and to such a degree as to effectually separate the heavier impurities therefrom, which during the passage of the water downwardly precipitate to the bottom of the sediment-chamber, and thus obviate the liability of the walls of the auxiliary water-chamber becoming coated with scale in a degree sufficient to impair their efficacy as heating mediums.

In practice the space allotted to a feed-water heater is often so limited that one of sufficient capacity and heating-surface cannot be employed unless provided with the central auxiliary chamber, and if flues or pipes were employed in such a device the heating-surface would be so reduced as to materially affect the temperature of the water in its passage from said chamber to the boiler-pipe. In addition to this the number of flues necessitates a large number of joints and connections, which not only reduce the efficiency and durability of such a structure, but greatly increase the cost of manufacture.

Having described my invention, what I claim, and desire to secure by Letters Patent, is—

1. The water-chamber, the external steam-jacket, and an internal steam-jacket having closed ends located in said water-chamber, in combination with an auxiliary water-chamber extending into and surrounded, excepting at the bottom, by said internal steam-jacket, substantially as described.

2. The water-chamber, the external steam-jacket, an internal steam-jacket having closed ends and forming an annular chamber between the side walls of the water-chamber and said internal jacket, and pipe-connections between said internal and external steam-jackets, in combination with an auxiliary water-chamber extending longitudinally into and surrounded, excepting at its open end, by said internal steam-jacket, substantially as described.

3. In a feed-water heater, an auxiliary water-chamber open at the bottom, in combination with a feed or supply pipe opening therein and provided with a funnel-shaped discharge end of slightly less diameter than said chamber, substantially as described.

4. In a feed-water heater, the external and internal steam chambers or jackets, in combination with a water-chamber between said internal and external chambers and an auxiliary water-chamber connected therewith and projecting into said internal steam-chamber, substantially as described.

5. In a feed-water heater, the external and internal steam chambers or jackets and a water-chamber between said jackets, in combination with an auxiliary water-chamber opening at the bottom into said water-chamber and projecting into said internal steam-chamber and a feed or supply pipe opening into said auxiliary water-chamber, having funnel-shaped discharge end of a slightly less diameter than said chamber, substantially as described.

EDWARD G. T. COLLES.

Witnesses:
WILL R. OMOHUNDRO,
W. W. ELLIOTT.